US011110411B2

(12) United States Patent
Benavides Perez et al.

(10) Patent No.: US 11,110,411 B2
(45) Date of Patent: Sep. 7, 2021

(54) SOLID-GAS-LIQUID (SGL) REACTOR FOR LEACHING POLYMETAL MINERALS AND/OR CONCENTRATES BASED ON LEAD, COPPER, ZINC, IRON AND/OR THE MIXTURES THEREOF

(71) Applicant: Penoles Tecnologia S.A. DE C.V., Coahuila (MX)

(72) Inventors: Ricardo Benavides Perez, Nuevo Leon (MX); Isaias Almaguer Guzman, Coahuila (MX); David Ezequiel Vazquez Vazquez, Coahuila (MX)

(73) Assignee: PENOLES TECNOLOGIA S.A. DE C.V., Coahuila (MX)

( * ) Notice: Subject to any disclaimer, the term of this patent is extended or adjusted under 35 U.S.C. 154(b) by 0 days.

(21) Appl. No.: 16/652,256

(22) PCT Filed: Nov. 6, 2017

(86) PCT No.: PCT/MX2017/000125
§ 371 (c)(1),
(2) Date: Mar. 30, 2020

(87) PCT Pub. No.: WO2019/088815
PCT Pub. Date: May 9, 2019

(65) Prior Publication Data
US 2020/0254405 A1 Aug. 13, 2020

(51) Int. Cl.
*B01F 7/16* (2006.01)
*C22B 3/02* (2006.01)

(52) U.S. Cl.
CPC .............. *B01F 7/1675* (2013.01); *C22B 3/02* (2013.01)

(58) Field of Classification Search
CPC .................................................. B01F 7/1675
(Continued)

(56) References Cited

U.S. PATENT DOCUMENTS 3,130,015 A * 4/1964 Monroe ................. B01J 19/006
422/226
3,149,888 A * 9/1964 Lennon ..................... B01F 7/18
384/130
(Continued)

FOREIGN PATENT DOCUMENTS

CN 102965497 A 3/2013
EP 0344238 B1 12/1992
(Continued)

OTHER PUBLICATIONS

International Search Report (ISR) for PCT/MX2017/000125 dated Jun. 13, 2018 (7 pages including English translation).
(Continued)

*Primary Examiner* — David L Sorkin
(74) *Attorney, Agent, or Firm* — Shumaker, Loop & Kendrick, LLP

(57) ABSTRACT

The present invention relates to a vertical low-pressure reactor with stirred tank for leaching polymetal minerals and concentrates of lead, copper, zinc, iron and/or the mixtures thereof, in a solid-gas-liquid three-phase suspension system. The low-pressure vertical reactor with stirred tank consists of: a cylindrical vertical container with three or four deflectors equidistantly distributed across the 360°; a stirring system made up of two impellers coupled to a rotary shaft, that provides adequate reaction and interaction of the metal species of interest; a space of the volume of the reactor, corresponding to 20% to 35% of the total volume of the container, located at the top of the reactor and which acts as a gas chamber that provides a continuous feed of oxygen;
(Continued)

and a system of coils placed on the outside or inside surface of the reactor to ensure efficient heat-transfer reactions and controlled kinetics.

14 Claims, 9 Drawing Sheets

(58) Field of Classification Search
    USPC .......................................... 366/307; 422/228
    See application file for complete search history.

(56) References Cited

U.S. PATENT DOCUMENTS

| | | | |
|---|---|---|---|
| 4,699,740 A | | 10/1987 | Bollenrath |
| 5,211,924 A | * | 5/1993 | Lee ........................... B01F 7/16 |
| | | | 366/279 |
| 5,240,327 A | * | 8/1993 | Nyman ................. B01F 7/1675 |
| | | | 366/262 |
| 6,955,461 B2 | | 10/2005 | Kar et al. |
| 9,273,157 B2 | * | 3/2016 | Brusselle ................ C08F 10/02 |
| 2004/0062144 A1 | * | 4/2004 | Hultholm .............. B01F 7/1675 |
| | | | 366/317 |
| 2009/0134173 A1 | * | 5/2009 | Liang ........................ B01F 7/22 |
| | | | 220/563 |
| 2012/0189746 A1 | * | 7/2012 | DeLong ................ B01F 7/1675 |
| | | | 426/231 |

FOREIGN PATENT DOCUMENTS

| | | |
|---|---|---|
| EP | 1309394 B1 | 2/2005 |
| WO | 2007/093668 A1 | 8/2007 |
| WO | 2014/118434 A1 | 8/2014 |

OTHER PUBLICATIONS

Written Opinion of the International Searching Authority for PCT/MX2017/000125 dated Jun. 13, 2018 (9 pages).
Written Opinion for PCT/MX2017/000125 dated Jun. 12, 2018 ( 9 pages total including Spanish version and English translation).
M. Latva-Kokko et al. "Sustainable agitator and reactor design for demanding applications in hydrometallurgy." Hydroprocess 2016, 8th International Seminar Process Hydrometallurgy, 2016, pp. 1-10.

* cited by examiner

SOLID-GAS-LIQUID (SGL) REACTOR FOR LEACHING POLYMETAL MINERALS AND/OR CONCENTRATES BASED ON LEAD, COPPER, ZINC, IRON AND/OR THE MIXTURES THEREOF

TECHNICAL FIELD OF THE INVENTION

The present invention is related to equipment for carrying out leaching of materials with metal contents and particularly, referred to a vertical reactor with a solid-gas-liquid, three-phase suspension system (SGL), which function is promoting low-pressure solid-gas-liquid type reactions to perform a chemical leaching reaction of polymetal minerals and/or lead, copper, zinc, iron base concentrates and/or their mixtures, and particularly, to convert metal sulfides and/or partially oxidized (copper, zinc and iron) compounds and/or mixtures thereof contained in minerals or concentrates into soluble species and obtaining a respective dissolution of their ions.

BACKGROUND OF THE INVENTION

There are several types of equipment for hydrometallurgical applications for performing leaching of materials with metal contents. Stirred-tank reactors at higher pressures are identified among them and which disadvantages are associated to the risk due to handling of high temperature and pressure conditions required in their operation in addition to high investment and operation associated costs. In bioleaching reactors and heap leaching reactors, recovery times are significant therefore extraction efficacy is lower and in some cases, it may represent a significant delay in operational cash flow. Following are described some currently available alternatives for equipment.

International patent application WO 2014/118434 (Outotec Oyj, 2014), describes a stirred tank reactor for gas-liquid mass transfer, including: (i) a drive shaft extended vertically in the reactor tank; (ii) a motor for rotating the drive shaft; (iii) a main impeller which is a downward pumping to create a main flow pattern in the reactor tank; (iv) a gas inlet into the reactor to disperse liquid, located in tank bottom; and (v) a mechanical gas sparging apparatus, coaxial with the drive shaft, and having a dispersion chamber with arrangement means for mixing the gas into the liquid by dispersing gas into fine bubbles. This reactor tank when opened allows gas loss when bubbles reach the top part thereof.

U.S. Pat. No. 4,699,740 (Huls Aktiengesellschaft, 1987) discloses a stirring system for gas introduction into liquids comprising: (i) an upright stirring vessel; (ii) gas inlet means; (iii) a substantially vertically extending draft tube in said vessel; (iv) a substantially vertically extending stirring shaft in said draft tube; and (v) means for impelling a liquid-gas mixture downward through said draft tube, said means for impelling comprising stirrers mounted on said stirring shaft, an upper stirrer positioned at the upper end of said draft tube proximate a gas space in said vessel, and a lower stirrer positioned at the lower end of said draft tube. The filling step of said mixing vessel with the liquid into which the gas is to be injected is limited such that a gas space will remain above the liquid at all times during operation, and said gas is fed by the lower end of said draft tube. Such patent does not disclose how solid phase interaction with liquid-gas mixture is carried out.

There are further developments of apparatuses for mixing suspension gas in a closed mixing reactor which use gas as process chemical product with high efficiency and which solid content in solution is high. In this regard, international patent application with publication number WO 2007/093668A1 (Outotec Oyj, 2007), describes a mixing apparatus for mixing gas in a suspension formed by one liquid and solids where the apparatus consists of: (i) a closed reactor; (ii) a mixer placed within the reactor; (iii) flow deflectors directed towards inside from the reactor wall; and (iv) a gas feed tube located in reactor bottom section.

In the references introduced in the background of the invention, the way of preventing the passivation effect of particles by formation of reaction product layer is not mentioned. Particle passivation causes a reduction in reaction velocity.

SUMMARY

In view of the limitations and disadvantages reported for equipment disclosed which are part of the state of the art, it is an object of the present invention to provide a novel vertical, three-phase, low-pressure reactor with stirred tank (SGL).

It is another object of the present invention to provide a vertical, three-phase, low-pressure reactor with stirred tank (SGL) to carry out a chemical leaching reaction in a suspension system including three solid-gas-liquid phases (SGL).

Another further object of the present invention is to provide a three-phase vertical, low-pressure reactor with stirred tank (SGL), with a stirring system allowing to enhance leaching kinetics in respect of conventional reactors and reducing the operation times, by an efficient use of reactant gas and its interaction with the other two phases.

Yet another object of the invention is to provide a vertical, three-phase, low-pressure reactor with stirred tank (SGL) with an arrangement or placement of the stirring system allowing generating and developing shear stresses to prevent particle passivation effect, promoting a permanent removal of the reaction product layer and invariably exposing new surface area prone to reaction.

Another further object of the present invention is to provide a vertical, three-phase, low-pressure reactor with stirred tank (SGL) for treatment of minerals or concentrates, comprising metal sulfides and/or partially oxidized (copper, zinc and iron) compounds and/or mixtures thereof, transforming them in soluble species in dissolution.

It is another object of the present invention to provide a vertical, three-phase, low-pressure reactor with stirred tank (SGL), offering the use of oxygen gas higher than 95% of efficiency as a quasi-stoichiometric oxygen consumption.

Other objects and advantages of the present invention may be apparent from the following description and the attached Figures which exclusively have illustrative but not limitative purposes of the scope of the invention.

The present invention refers to a vertical, three-phase, low-pressure reactor with stirred tank (SGL) for carrying out a chemical leaching reaction of polymetal minerals and lead, copper, zinc, iron base concentrates and/or their mixtures, in a solid-gas-liquid, three-phase suspension system (SGL).

The vertical, three-phase, low-pressure reactor with stirred tank (SGL), includes two stirring impellers of different type each other coupled over a rotating shaft; optionally three to four deflectors attached to reactor inner vertical wall with an equidistant distribution among them; a reactor volume space of between 20% to 35% of the total volume in the reactor upper part acting as an oxygen chamber to provide a continuous oxygen feed; and a system of coils arranged over the outer and/or inner surface of the reactor to assure efficient yields of heat transfer and a controlled kinetics.

DETAILED DESCRIPTION OF THE INVENTION

The present invention refers to a vertical, three-phase, low-pressure reactor with stirred tank (SGL), designed to promote solid-gas-liquid type reactions for performing a chemical leaching reaction of polymetal minerals and/or lead, copper, zinc, iron base concentrates and/or their mixtures, and particularly, to convert metal sulfides and/or partially oxidized (copper, zinc and iron) compounds and/or mixtures thereof contained in minerals or concentrates into soluble species, obtaining a dissolution of their ions.

Figure 1:
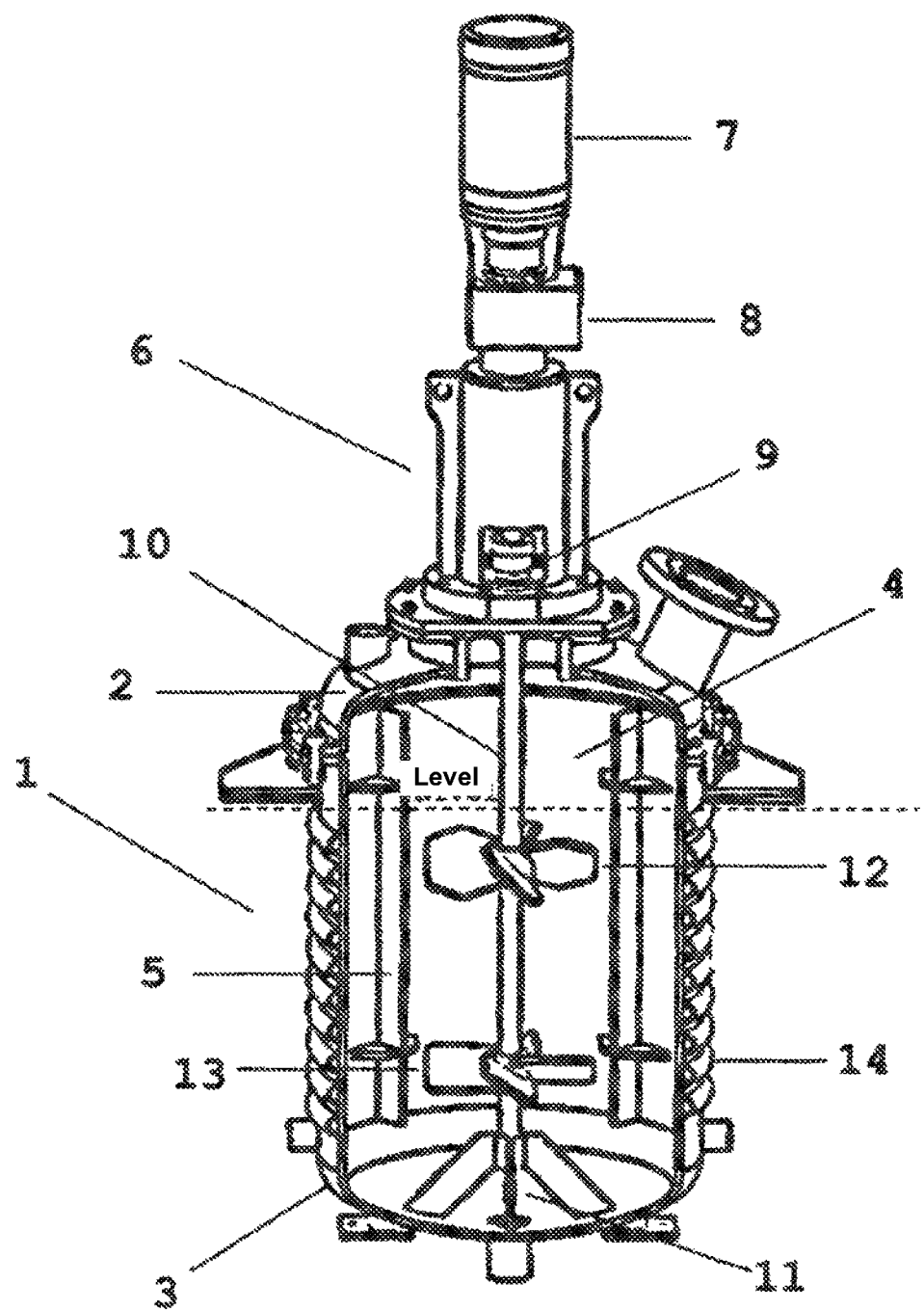
FIG. 1 is a view in a vertical cross-section of the vertical, three-phase, low-pressure reactor with stirred tank (SGL) of the invention showing its main components.

FIG. 1 shows a vertical cross-section schematic view of the vertical, three-phase, low-pressure reactor with stirred tank (SGL) of the present invention where the following actions are carried out:

a) Homogeneous dispersion of gas and solids in the solution, due to the arrangement of stirring system (6), deflectors (5) and design of the vertical, three-phase, low-pressure reactor with stirred tank (SGL), generating a turbulent flow.

b) Interaction of the three solid-gas-liquid phases, because of the stirring system (6) constituted by two impellers (12 and 13); an upper impeller (12) generating a flow pattern allowing gas introduction and a lower impeller (13) generating a flow pattern allowing homogeneous suspension, interaction, and diffusion of three phases (SGL), promoting solid-gas-liquid type leaching reactions.

c) Dynamic and continuous removal of the passivation layer placed on particle surface, due to chemical transformation reactions favored by shear and friction mechanical force, and by collision among particles which are in turn generated by the arrangement of the stirring system (6), deflectors (5), and flow pattern over partially reacted particles.

d) Energy control due to a system of coils (14) arranged over the outer and/or inner reactor surface to assure efficient heat transfer yields regardless whether reaction is endothermic or exothermic.

e) Oxygen efficient consumption since it is a closed reactor, thus preventing losses by unreacted oxygen exhaust.

Figure 2:
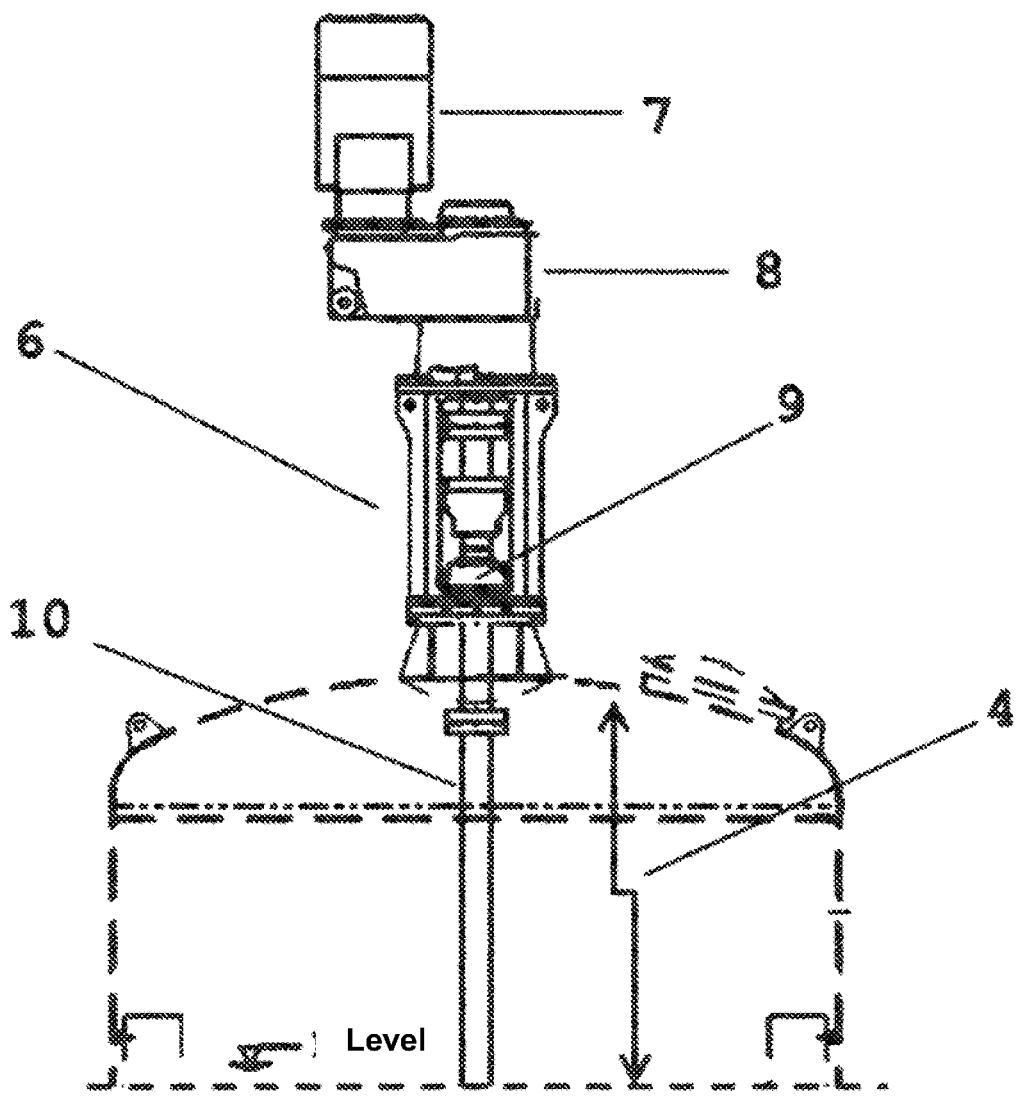
FIG. 2 is a schematic view of the chamber of the vertical, three-phase, low-pressure reactor with stirred tank (SGL) of the invention.

To prevent steam partial pressure and to maintain oxygen partial pressure in the gas chamber (FIG. 2), the reactor needs to be operated at pressures preferably between 83 and 138 kPa (12 and 20 psia), and temperatures below 110° C.

The vertical, three-phase, low-pressure reactor with stirred tank (SGL) of the invention is described below.

Figure 3:
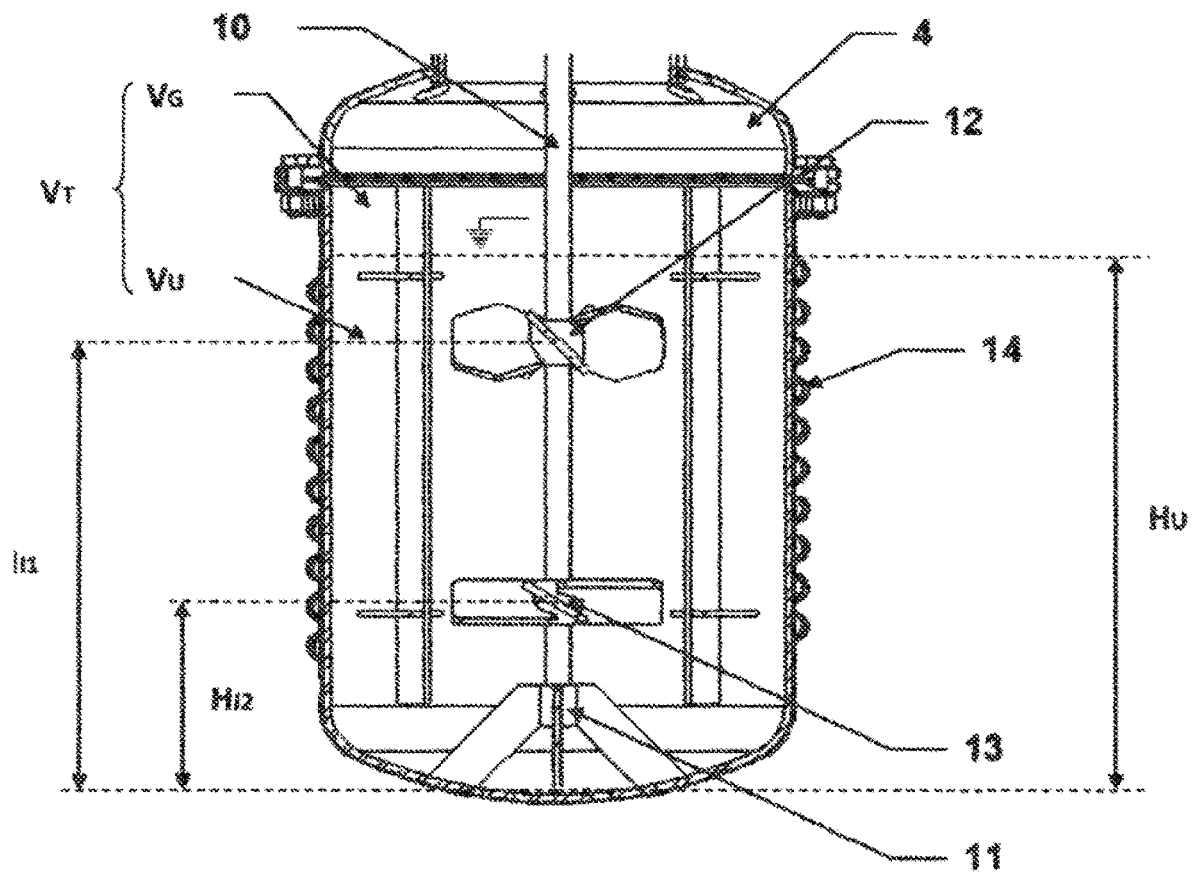
FIG. 3 is a cross-section schematic view indicating the main geometric parameters of the vertical, three-phase, low-pressure reactor with stirred tank (SGL) of the invention.

According to FIGS. 1 and 3, the vertical, three-phase, low-pressure reactor with stirred tank (SGL) of the invention, consists of a cylindrical-shape vertical container (1) with upper (2) and lower (3) torispherical heads, wherein reactor dimensions depend on the volume occupied by the suspension (VS) in the reactor, which is from 65% to 80% of the total volume (VT) thereof. The remaining space located in reactor upper part (VB) corresponding from 20% to 35% of total reactor volume, acts as gas chamber (4) providing a continuous gas feed being oxygen ($O_2$) the used gas reactant which enters through reactor upper part for filling the gas chamber (4). The ratio between suspension level height ($H_S$) and reactor diameter (DR) is in the range from 0.97 a 1.03 ($H_S/D_R$).

The reactor optionally has three or four deflectors (5) vertically arranged in the straight vertical wall of the reactor (1), equidistantly distributed around 360°. Width of each of the deflectors corresponds to $\frac{1}{12}$ of reactor diameter and separated from the wall $\frac{1}{72}$ of the reactor diameter.

Figure 4:
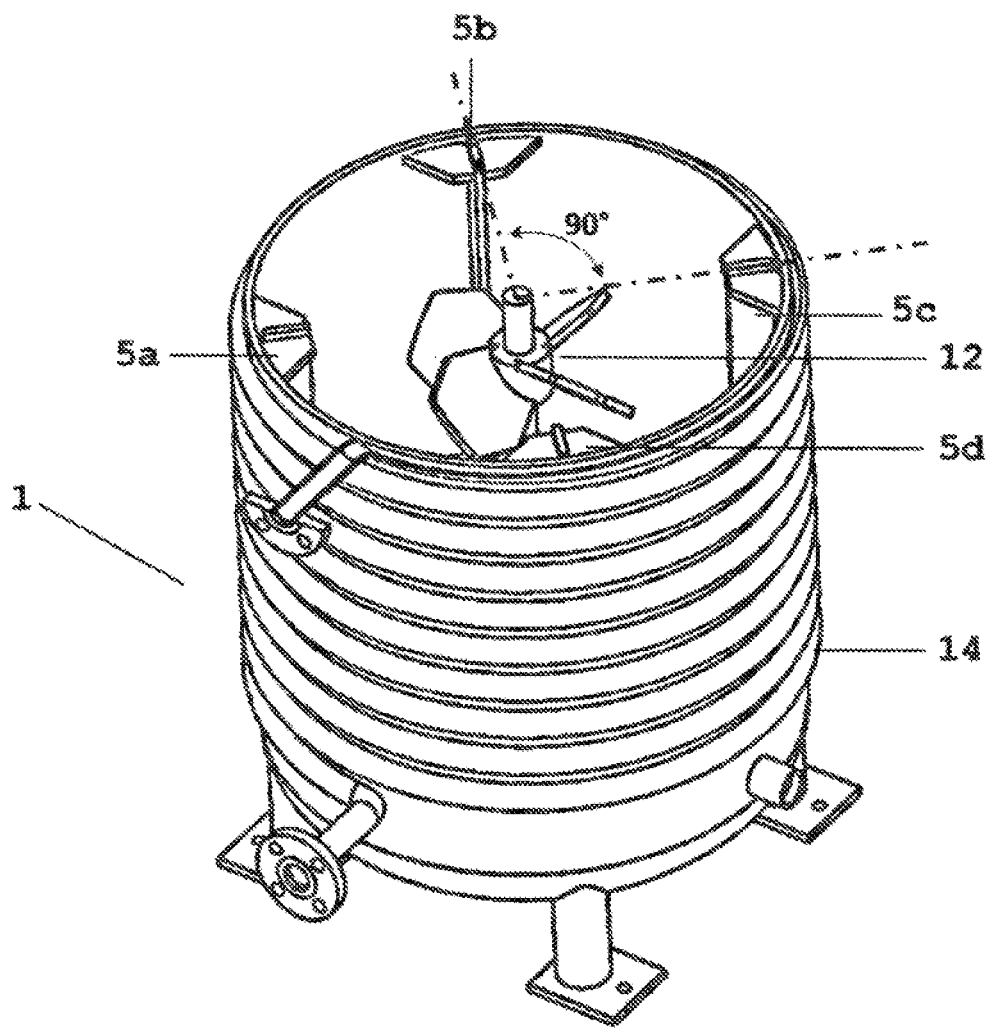
FIG. 4 is a schematic view in perspective of the internals of the vertical, three-phase, low-pressure reactor with stirred tank (SGL) of the invention, in one embodiment with four deflectors.
Figure 5:
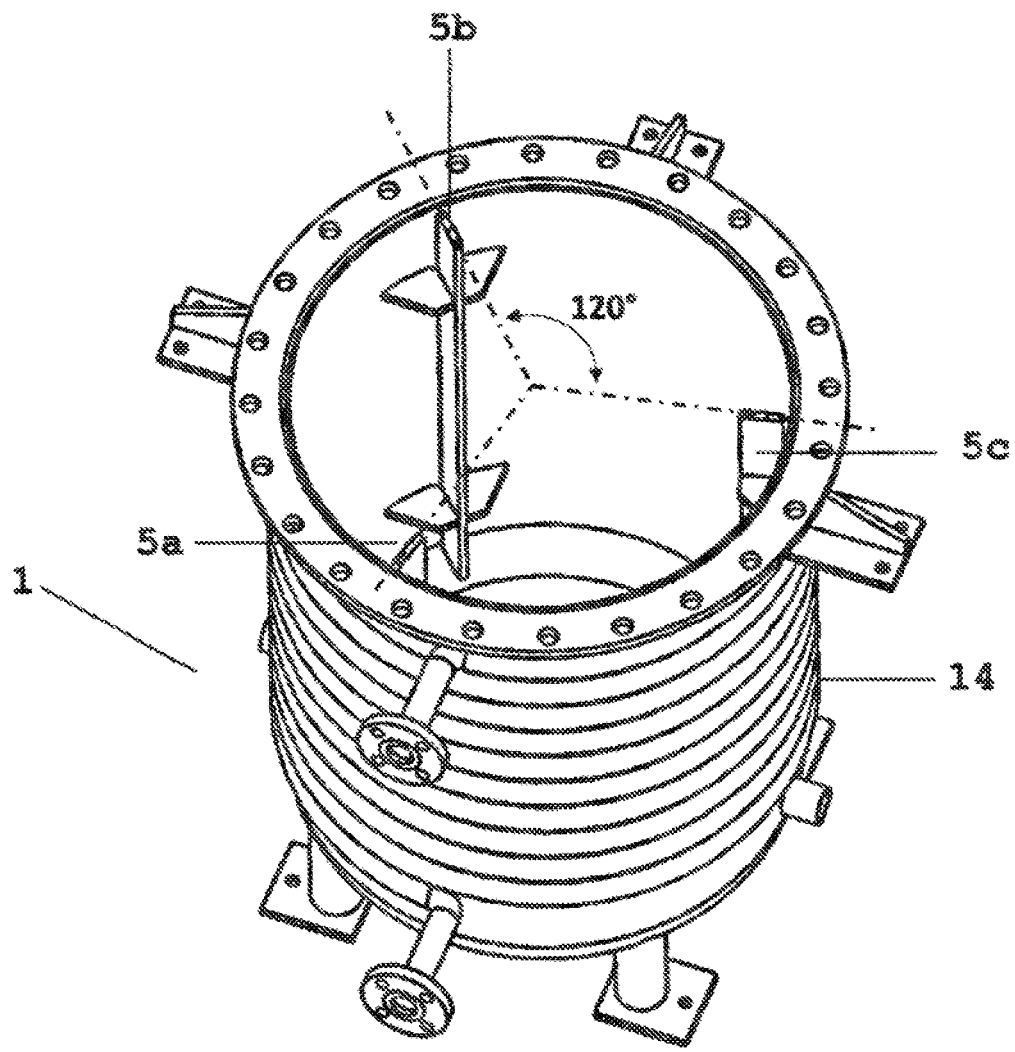
FIG. 5 is a schematic view in perspective of the internal section of the vertical, three-phase, low-pressure reactor with stirred tank (SGL) of the invention, in one embodiment with three deflectors.

FIG. 4 shows the internal section of the cylindrically-shaped vertical container (1) of a vertical, three-phase, low-pressure reactor with stirred tank (SGL) of the invention in one embodiment with an arrangement of four deflectors (5a, 5b, 5c and 5d) arranged at 90°; and FIG. 5 corresponds to one arrangement embodiment for three deflectors (5a, 5b and 5c) arranged at 120°.

Figure 6:
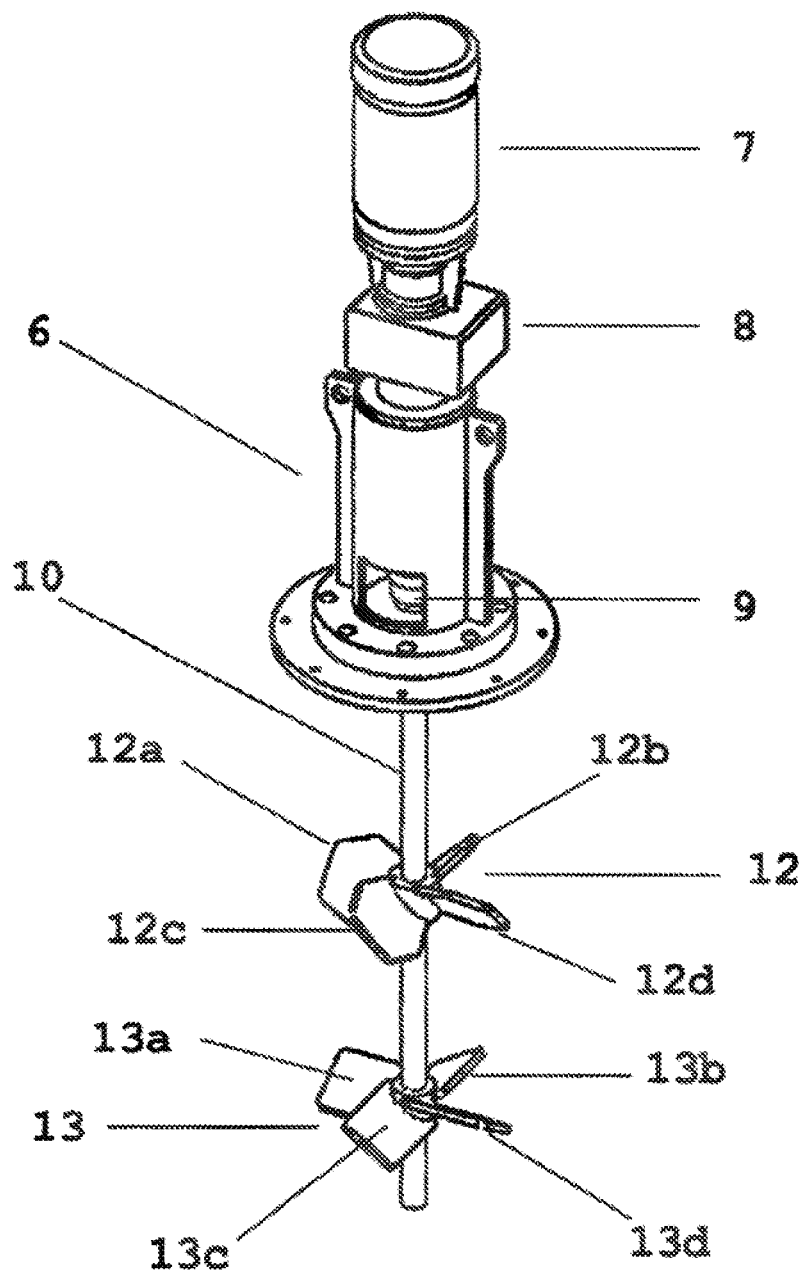
FIG. 6 is a schematic view in perspective of the stirring system of the vertical, three-phase, low-pressure reactor with stirred tank of the invention.

The vertical, three-phase, low-pressure reactor with stirred tank (1) of the invention includes a stirring system (6), which is shown in detail in FIG. 6, wherein said stirring system (6) is composed by:
an electric motor (7),
a torque transmitter (8),
a mechanical seal (9),
a rotating shaft (10),
a guide (11) to prevent eccentric movement (see FIG. 1), and
two impellers, an upper first impeller (12), and a lower second impeller (13).

Figure 7:
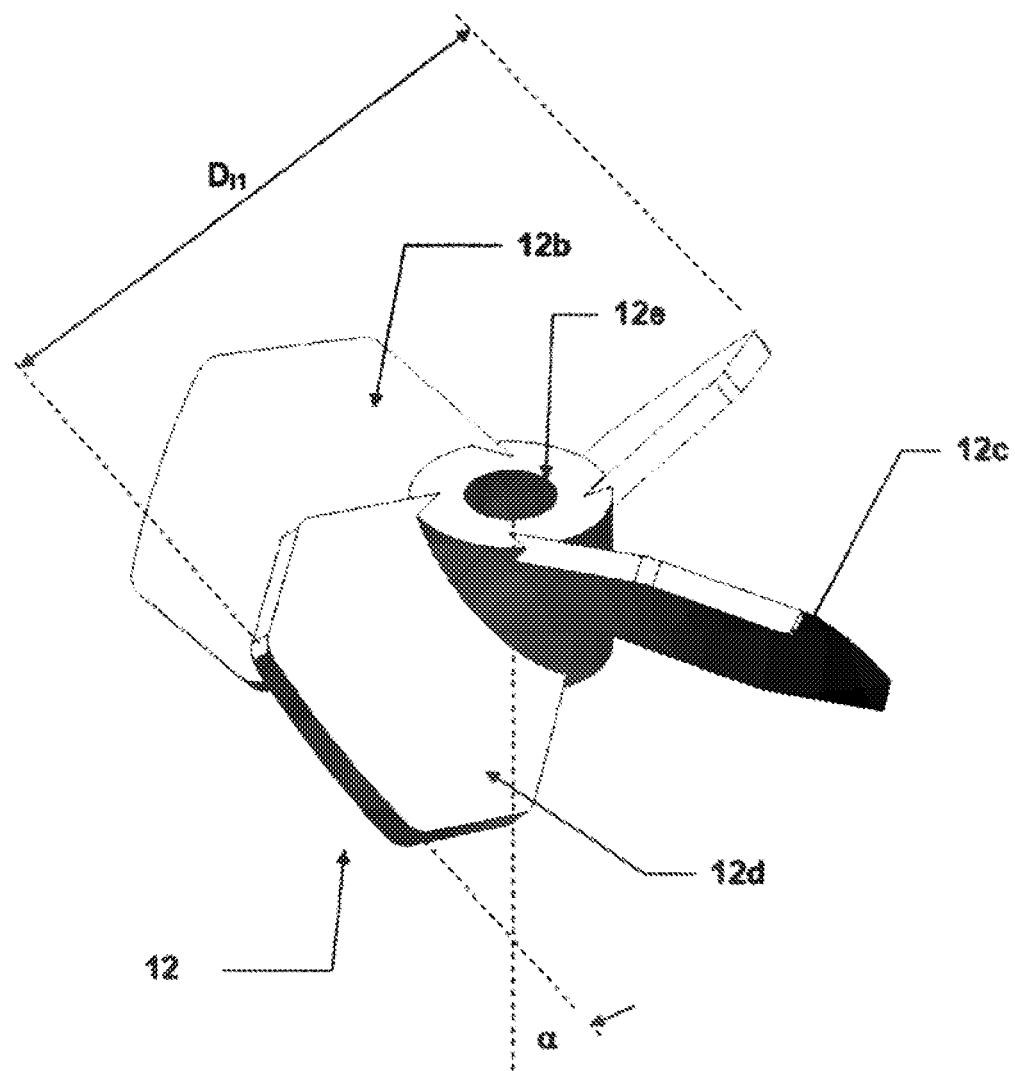
FIG. 7 is a schematic view in perspective of the stirring system upper impeller of said vertical, three-phase, low-pressure reactor with stirred tank (SGL) of the invention.

Impellers (12 and 13) are of different type each other. FIG. 7 shows the first impeller (12) located at reactor upper part (1), just below the suspension level being it of high-discharge type with a power number between 1.5 and 1.7 and a pumping number between 0.85 and 0.87; with 4 concave vanes (12a, 12b, 12c and 12d) having a half-oval shape and arranged in a wheel hub (12e) in a 45° angle ($\alpha$), where the ratio between the upper impeller diameter ($D_{IS}$) (12) and the reactor diameter (Da) is in the range from 0.38 to 0.5

Figure 8:
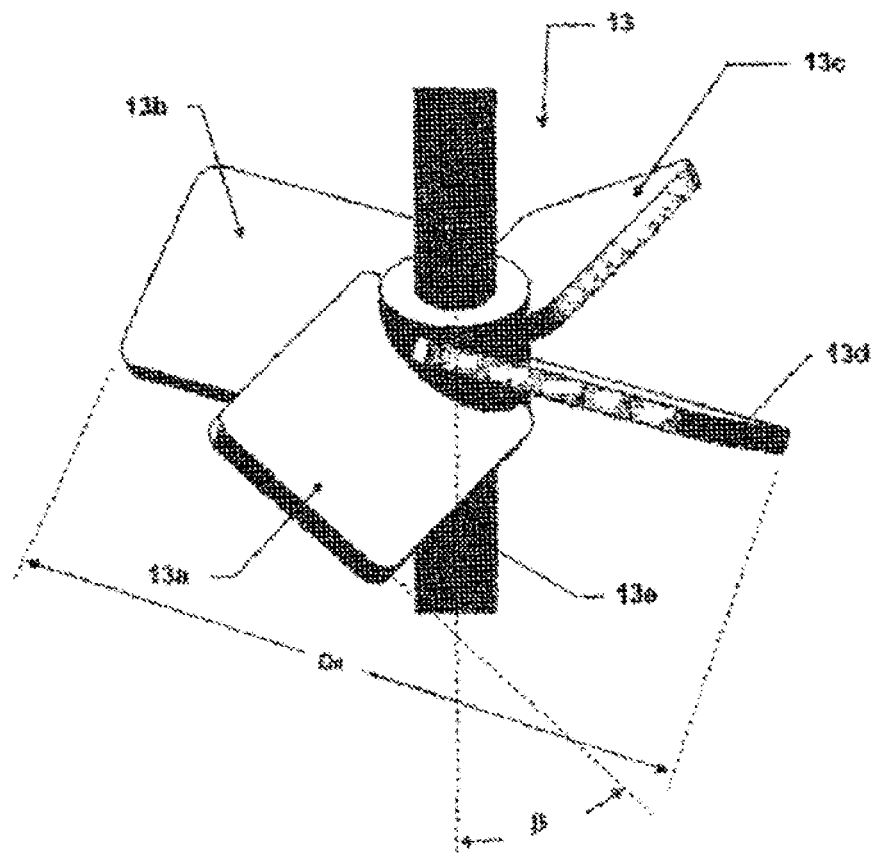
FIG. 8 is a schematic view in perspective of the stirring system lower impeller of the vertical, three-phase, low-pressure reactor with stirred tank (SGL) of the invention.

($D_{IS}/D_R$). FIG. 8 shows the second impeller (13) located in reactor bottom part (1), at a height ($H_{II}$) from reactor bottom of ⅓ of the lower impeller diameter ($D_{II}$), with a power number between 0.9 and 1.65 and a pumping number between 0.68 and 0.88; being of axial type with 4 flat vanes (13a, 13b, 13c and 13d) having a rectangular shape and arranged in a wheel hub (13e) in an angle (β) in the range from 32° to 45°; wherein the ratio between the lower impeller diameter ($D_{II}$) (13) and reactor diameter ($D_R$) is in the range from 0.36 to 0.40 ($D_{II}/D_R$).

The stirring system (6) effectively operates by introducing gas from the reactor upper part (1) up to the core of the suspension with the peripheral velocity necessary to homogeneously disperse gas into the liquid phase (in the range from 680 to 770 m/min). Separation between the upper impeller (12) and the lower impeller (13) keeps a ratio between the upper impeller height ($H_{IS}$) in respect of the lower impeller height ($H_{II}$) in the range from 7.65 to 7.75 ($H_{IS}/H_{II}$) allowing establishing a synergistic action between gas induction into liquid core and gas dispersion, achieving an effective attrition system between impellers-particle-particle preventing passivation.

Furthermore, impellers (12) and (13) in the reactor (1), maintain the solid particles homogeneously suspended and distributed providing a suitable interaction of mineralogic species of interest with the gas and liquid phase to carry out the intended reactions, increasing reaction velocity with efficient gas reagent consumption higher than 95%.

According to FIG. 1, the reactor has a system of coils (14) which may be arranged over the reactor outer and/or inner surface depending on the power amount to be transferred. FIG. 1 shows the reactor with the external arrangement of the system of coils. This system is to assure efficient yields on heat transfer notwithstanding whether is an endothermic or exothermic reaction. When reaction is exothermic water is used as cooling means to prevent that temperature exceeds 110° C., and when reaction is endothermic steam or thermal oil is used as heating means to increase suspension temperature.

The reactor generally functions to promote solid-gas-liquid type reactions and, particularly, transform metal sulfide and/or partially oxidized (copper, zinc and iron) compounds with $d_{80}$ sizes less than 100 mesh (150 microns), and/or mixtures thereof contained in minerals or concentrates, in soluble species and obtaining a respective dissolution of their ions.

Operation conditions for reactor (1) depend on the material to be leached; the reactor generally operates at an oxygen partial pressure in a range from 7 to 207 kPa (1 psia to 30 psia); with a stirring speed between 50 to 700 rpm depending on reactor diameter; stirring speed should guarantee that peripheral velocity is between 680 and 770 m/min to obtain an efficient contact between solid-gas-liquid; temperature is in the range from 90 to 110° C.; solid concentration varies from 50 to 500 g/L; acidity or alkalinity such as sulfuric acid or sodium hydroxide will depend on the type and metal content of the solid material to be leached and its concentration at the end of reaction; reaction time is less than 16 hours achieving a quasi-stoichiometric oxygen use higher than 95% of efficiency.

Further, the process considers the three solid-gas-liquid phases (SGL), i.e., the acidic or alkaline leaching solution as liquid phase, sulfide and/or metal oxide mineral and/or mixtures thereof as solid phase, and oxygen as gas phase.

The reactor (1) and its stirring system (6) provide a suitable interaction of metal species of interest with liquid and gas phases, this interaction causes that reaction velocity is increased, decreasing the required residence times and increasing extractions at levels higher than 97%.

For those materials having copper sulfide species (chalcocite or chalcopyrite) reaction time is between 4 and 7 hours; at an oxygen partial pressure of 83 to 138 kPa (12 to psia) obtaining copper extractions higher than 97%. In other equipment operating at low pressure, the reported reaction time is higher than 12 hours.

Figure 9:
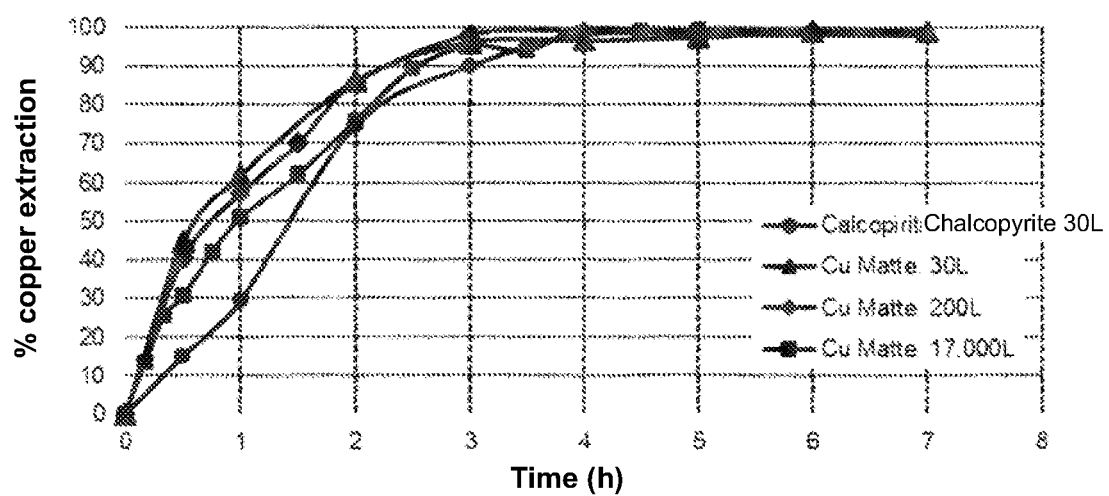
FIG. 9 is a graph showing the reaction time for leaching copper concentrates (chalcopyrite) in a 30-liter vertical, three-phase, low-pressure reactor with stirred tank (SGL), and of a chalcocite-base material in vertical, low-pressure reactor with stirred tank, with different capacity (30, 200 and 17,000 L).

The graph in FIG. 9 shows copper extraction profiles experimentally obtained in respect of time for two types of copper-containing materials, i.e., matte (CuS) and chalcopyrite ($CuFeS_2$), under operational conditions from 83 to 138 kPa (12 to 20 psia); from 95 to 105° C. and a solid initial concentration from 150 to 240 g/L. In said FIG. 9, the copper extraction rate of both materials is noticed to be practically the same in reactors of different capacities, that is, reactor performance is equivalent for different capacities.

The present invention is further described by means of the following examples which shall not be considered as limiting the scope of protection, but illustrative of the application of the invention.

EXAMPLE 1

Leaching of matte-speiss material ($Cu_2S$—$Cu_3As$) proceeding from a lead foundry using the solid-gas-liquid three phase (SGL) reactor of the invention.

A matte-speiss sample containing 40.13% copper, 20.40% lead, 10.5% total sulfur, 6.73% iron and 4.22 arsenic, is subject to dry milling until reaching a particle size $P_{90}$ of 45 microns. Then, 4,310 g of matte-speiss material are subject to leaching in a vertical, low-pressure reactor with stirred tank with three solid-gas-liquid phases (SGL) according to the present invention, wherein the sample is mixed with an acidic solution containing 5 g/l of iron as iron sulfate, 18 g of a surfactant reactant, and 180 g/l of initial free acidity. The reactor is closed and kept at an oxygen partial pressure of 83 kPa (12 psia), reaction temperature is 90° C. and is left reacting over 7 hours. Table 1 shows the results obtained from copper extraction in function of leaching time.

TABLE 1

Copper extraction in function of leaching time for the case of treatment of matte-speiss ($Cu_2S$-$Cu_3As$) proceeding from a lead foundry

| TIME (Hour) | EXTRACTION (%) |
| --- | --- |
| 0 | 0.0 |
| 0.5 | 48.6 |
| 1 | 67.3 |
| 1.5 | 74.0 |
| 2 | 80.8 |
| 3 | 88.6 |
| 4 | 94.9 |
| 5 | 95.5 |
| 6 | 96.7 |
| 7 | 99.2 |

EXAMPLE 2

Leaching of chalcopyrite-based copper concentrates using the reactor with three solid-gas-liquid phases (SGL) of the invention.

A sample of a chalcopyrite concentrate containing 21.43% copper, 6.36% zinc, 22.04% iron, is subject to leaching in a vertical, low-pressure reactor with stirred tank with three solid-gas-liquid phases (SGL) according to present invention, wherein the sample is mixed with a solution at a ratio of 100 g solid per liter. The solution at 95° C., contains 125 g/L of free sulfuric acid. The reactor is closed and kept at an oxygen partial pressure of 83 to 124 kPa (12-18 psia), reaction temperature is of 95 and 105° C.; stirring speed is kept constant at 588 rpm. Table 2 shows copper extraction in function of leaching time.

TABLE 2

Copper extraction in function of leaching time for the case of treatment of chalcopyrite-base copper concentrates

| TIME (Hour) | EXTRACTION (%) |
|---|---|
| 1 | 57.9 |
| 2 | 75.2 |
| 3 | 79.0 |
| 4 | 81.8 |
| 5 | 82.0 |
| 6 | 83.1 |
| 7 | 86.6 |
| 8 | 91.0 |

EXAMPLE 3

Leaching of sphalerite-base zinc concentrate using the three phase solid-gas-liquid (SGL) reactor of the invention.

A sample of 262 g of a zinc concentrate containing 48.5% zinc, 12.39% iron and 34.6% total sulfur, is subject to grinding up to obtaining a particle size $P_{90}$ of 45 microns, the obtained material is transferred to leaching in a vertical, low-pressure reactor with stirred tank with three solid-gas-liquid phases (SGL) according to present invention, wherein the sample is mixed with 239 g of zinc ferrite containing 19.8% zinc, 25% total iron and 21.6% iron (+3), this material mixture is added to a solution composed of 0.4 l water, 0.043 l sulfuric acid at 98% purity and 3.070 l of a zinc sulfate solution containing 36.50 g/l of zinc as zinc sulfate and 165.6 g/l of free sulfuric acid. The reactor is closed and kept at an oxygen partial pressure of 83 kPa (12 psia), reaction temperature is 90° C. and is left reacting in a range from 4-10 hours, depending on involved mineral species, REDOX potential during this reaction time is kept between 400 and 500 mv, in respect of Ag/AgCl electrode. Table 3 shows zinc extraction in function of leaching time.

TABLE 3

Zinc extraction in function of leaching time in case of treatment of sphalerite-based zinc concentrates

| TIME (Hour) | EXTRACTION (%) |
|---|---|
| 1 | 38.6 |
| 2 | 49.2 |
| 4 | 70.0 |
| 5 | 75.0 |
| 6 | 83.4 |
| 8 | 97.2 |
| 10 | 98.5 |
| 14 | 99.3 |

It will be apparent for any person with skills in the technical field that several modifications in the composition and nature of the raw material fed into the reactor of the invention, will require adjustments in operation or manufacturing parameters, however, such modifications and amendments shall be considered within the scope of the present invention.

Having been disclosed the invention the contents in the following claims is deemed novel and thus claimed as property:

1. A reactor for leaching polymetal minerals and lead, copper, zinc, iron base concentrates and/or their mixtures, in a solid-gas-liquid, three-phase suspension system (SGL), comprising:
   a. a cylindrical vertical container with an upper torispherical head and a lower torispherical head, the cylindrical vertical container having an outer surface, an inner surface, and a bottom;
   b. a stirring system coupled to the upper torispherical head of the cylindrical vertical container, formed by:
      i. an electric motor,
      ii. a torque transmitter,
      iii. a mechanical seal,
      iv. a rotating shaft axially extending through the upper torispherical head into the cylindrical vertical container and being coupled to
      a guide that is fixed to the lower torispherical head to prevent eccentric movement, and
      v. a first stirring impeller having a first stirring impeller diameter and a second stirring impeller having a second stirring impeller diameter, the first and second stirring impellers being coupled to the rotating shaft; and
   c. a system of coils for heat exchange, arranged over the outer and/or inner surface of the cylindrical vertical container;
   wherein:
      i. the cylindrical vertical container comprises a total volume and a useful volume, the useful volume of the vertical container being between 65% and 80% of the total volume; wherein the remaining volume of between 20% and 35% of the total volume forms a gas chamber above the useful volume of the cylindrical vertical container;
      ii. the cylindrical vertical container comprises a reactor diameter and a useful volume height, wherein a ratio between the reactor diameter and the useful volume height is of 0.97 to 1.03;
      iii. said cylindrical vertical container comprises on its inner surface, a deflector arrangement comprising deflectors being equidistantly distributed in the inner surface of the cylindrical vertical container;
      iv. the first and second stirring impellers are each of a different impeller type; wherein, when a suspension container and thereby provides a suspension level, the first stirring impeller is located in the shaft just below the suspension level and the second stirring impeller is located in the shaft lower part at a height from reactor bottom of ⅓ of the second stirring impeller diameter.

2. The reactor according to claim 1, wherein, the deflectors of the deflector arrangement have a width of 1/12 of reactor diameter and are separated from the inner surface of the cylindrical vertical container by 1/72 of the reactor diameter.

3. The reactor according to claim 1, wherein the deflector arrangement, consists of 3 deflectors being placed at 120° each other.

4. The reactor according to claim 1, wherein the deflector arrangement, consists of 4 deflectors being placed at 90° each other.

5. The reactor according to claim 1, wherein the first stirring impeller is a high discharge impeller with 4 half-oval shaped concave vanes and arranged into a wheel hub in a 45° angle; wherein the ratio between the first stirring impeller diameter and the reactor diameter is in the range from 0.38 to 0.5.

6. The reactor according to claim 1, wherein the second stirring impeller is an axial impeller; with 4 rectangularly-shaped flat vanes arranged into a wheel hub in a 32° to 45° angle; wherein the ratio between the second stirring impeller diameter and the reactor diameter is in the range from 0.36 to 0.40.

7. The reactor according to claim 1, wherein the first stirring impeller is located at a first stirring impeller height from the cylindrical vertical container bottom and the second stirring impeller is located at a second stirring impeller height from the cylindrical vertical container bottom, wherein the ratio of the first stirring impeller height to the second stirring impeller height is in the range from 7.65 to 7.75.

8. The reactor according to claim 1, wherein the gas chamber contains oxygen as gas reagent.

9. The reactor according to claim 1, wherein the reactor is operated within:
   a. an oxygen partial pressure of 7 to 207 kPa;
   b. a peripheral velocity of 680 to 770 m/min to homogeneously disperse the solid and gas phase into the liquid phase;
   c. a temperature from 90° C. to 110° C.;
   d. an acidity or alkalinity from 20 g/l to 300 g/l;
   e. a solid concentration from 50 to 500 g/L; and
   f. a reaction time from 2 to 16 hours.

10. The reactor according to claim 1, wherein the reactor operates at an oxygen partial pressure preferably of 83 to 138 kPa.

11. The reactor according to claim 4, wherein when used with a copper sulfide ($Cu_2S$) base material, operation times are in the range from 6-8 hours.

12. The reactor according to claim 1, wherein the oxygen consumption is quasi-stoichiometric, with a use of oxygen gas higher than 95% of efficiency.

13. The reactor according to claim 1, wherein when materials containing copper sulfide species are used at an oxygen partial pressure from 83 to 138 kPa, the reaction time is in the range between 4 and 7 hours, obtaining copper extractions higher than 97%.

14. The reactor according to claim 1, wherein:
   a) the first stirring impeller is a high discharge impeller with 4 half-oval shaped concave vanes and arranged into a wheel hub in a 45° angle; wherein the ratio between the first stirring impeller diameter and the reactor diameter is in the range from 0.38 to 0.5; and
   b) the second stirring impeller is an axial impeller; with 4 rectangularly-shaped flat vanes arranged into a wheel hub in a 32° to 45° angle; wherein the ratio between the second stirring impeller diameter and the reactor diameter is in the range from 0.36 to 0.40.

* * * * *